United States Patent [19]

Villwock et al.

[11] Patent Number: 5,396,617
[45] Date of Patent: Mar. 7, 1995

[54] MODULE FOR EXTENDING THE FUNCTIONS OF AN ELECTRONIC DATA PROCESSING MACHINE

[75] Inventors: Thomas Villwock, Niedernhausen; Stefan Gliem, Berlin, both of Germany

[73] Assignees: Mips Management Information Systems Technologies GmbH, Niedernhausen; ESD Electronic Systems Design GmbH, Berlin, both of Germany

[21] Appl. No.: 138,023

[22] Filed: Oct. 19, 1993

[30] Foreign Application Priority Data

Feb. 2, 1993 [DE] Germany ............... 43 03 620.1

[51] Int. Cl.⁶ ............................................. G06F 13/00
[52] U.S. Cl. ................................ 395/500; 364/DIG. 2; 364/929.4; 364/932; 364/932.1; 364/952; 364/952.1; 364/953; 364/953.3
[58] Field of Search ............. 395/DIG. 1 MS File, 395/DIG. 2 MS File, , 275, 400, 425, 500; 295/600, 800; 235/380, 381, 382, 383; 361/392, 393, 391, 394, 395, 396, 397, 398, 399, 412, 413, 414, 415; 365/189.01, 189.03

[56] References Cited

U.S. PATENT DOCUMENTS

| | | | |
|---|---|---|---|
| 5,036,429 | 7/1991 | Kaneda et al. | 361/392 |
| 5,091,856 | 2/1992 | Hasegawa et al. | 364/424.05 |
| 5,180,906 | 1/1993 | Yamada | 235/487 |

FOREIGN PATENT DOCUMENTS

| | | |
|---|---|---|
| 3818025 | 11/1989 | Germany . |
| 3903454 | 6/1990 | Germany . |
| 8814802 | 10/1990 | Germany . |
| 4112292 | 10/1992 | Germany . |
| 62-157391 | 7/1987 | Japan . |

*Primary Examiner*—Robert B. Harrell

[57] ABSTRACT

Write-read unit in the form of a compact hybrid drive for combination or alternative use of plugable, removable, encapsulated flat modules equipped with semiconductors (IC cards) and with one or several drives for rotating storage media, such as drives for floppy disks, hard disks, compact disks as well as magneto-optic drives to be connected to electronic devices, such as electronic data processing machines, printers or controls. The selection of the write-read unit is effected via an integrated electronics either joint or separate for the storage media. Existing electronic devices can be extended without requiring additional space in order to shift complex data processing transactions onto the IC card, thus relieving the central processing unit.

12 Claims, 9 Drawing Sheets

MODULE FOR EXTENDING THE FUNCTIONS OF AN ELECTRONIC DATA PROCESSING MACHINE

A MODULE FOR EXTENDING THE FUNCTIONS OF AN ELECTRONIC DATA PROCESSING MACHINE

1. Field of the Invention

The invention is directed to a write-read unit for electronic devices with storage media, such as plugable, removable, encapsulated flat modules (IC cards) equipped with semiconductors or storage media with rotating drives, such as floppy disk, hard disk, compact disk and magneto-optic drives to be connected to electronic devices like data processing machines, printers or controls.

2. Background of the Invention

It is common practice to equip computers to which a central access can be effected with several identical or also different drives (floppy disks, CD-ROM, hard disks, IC cards). Each drive or storage medium constitutes a separate module designed as a plug-in unit or independent unit individually connected with the central processing unit (CPU). Any access to the data is effected separately via the CPU. The disadvantage of these solutions is shown by the fact that the integrated use as well as the exchange of data and information stored in different storage media can be carried out only via the CPU. Thus, much processing capacity available in the CPU gets lost for fulfilling other tasks. For this reason, additional functions being closely connected with the storage of data, such as data coding, data compaction and error detection and correction must be implemented in the central processing unit. Another disadvantage conventional devices is that such electronic devices being extended and added on by new storage media require more space, have a bigger weight and therefore need more energy and material. This holds especially true for the additional use of IC cards which are able to store large amounts of data.

In the U.S. Pat. No. 5,036,429, a write-read unit in connection with an electronic device, e.g. a computer, is described, consisting of a removable plug-in unit in the form of an IC card receptor portion which is to receive several IC cards. Thus, an optional access to one or several IC cards is ensured. The disadvantage of this invention becomes evident in the fact that it is restricted to one storage medium only.

SUMMARY OF THE INVENTION

The present invention aims at enabling the use of plugable, removable, encapsulated flat modules (IC cards) equipped with semiconductors in electronic devices with rotating drives without being forced to extend their constructional design. In addition, its objective is to increase the efficiency of these electronic devices by shifting of functions.

According to the first embodiment of the invention, a write-read unit in the form of a hybrid drive serves for the combination and alternative use of plugable, removable, encapsulated flat modules (IC cards) equipped with semiconductors with one or more drives for rotating storage media, such as floppy disk, hard disk, compact disk and magneto-optic drives to be connected to electronic devices like electronic data processing systems, printers or controls. The write-read unit is selected—with regard to the storage media—via joint or separate integrated electronic parts.

As linking modules between the control electronics for the write-read unit and the CPU of the electronic device, printed circuit boards, interface cables or the transmission by electromagnetic waves are optionally provided. The high user-friendliness of the write-read unit is ensured by a suitable arrangement of the essential operating and indicating elements. Optoelectronic displays, such as segment displays, LED's or liquid-crystal displays serve for the indication of the status or operating condition of the storage media in the write-read unit. Operating elements, such as switches and/or buttons, mechanical ejecting devices as well as electromechanical locking devices are provided at the front and/or rear portion. The locking devices protect the write-read unit from environmental influences or unauthorized adding or removing of rotating storage media or IC cards.

The combination of an IC card with other storage media results in an advantageous use of the invention in the field of data security and/or access security. This is reached by the IC card containing a ciphering chip which codes and decodes, respectively, parts or all memory stocks stored in the data processing machine. In addition to that, the IC card can take over functions ensuring the prevention of uncontrolled data exchange between different data processing machines, the increase of capacity of the rotating storage medium by data compaction dependent on the IC card as well as the detection and correction of errors by means of a mechanism stored on the IC card.

A special procedure implemented in the IC card ensures protection from certain programs (viruses, worms, Trojan horses) illegally installed or being installed on the data processing machine in order to affect its proper functioning. The boot sector is residently stored on the card. Reprogramming is only possible by applying a special procedure after a switch accessible from outside has been actuated. For booting, the switch must be reset. Viruses then aiming at changing the boot sector have not got a chance to do so any longer as there is a write protection implied in the hardware. In addition, a certain check sum is stored on the card for all files. Programs changing these files will be detected as the check sum of the files will change also.

Although a few examples of relevant functions based on the use of the IC card were mentioned here only, an expert will find a large number of further vistas opening up by the interaction of the IC card with other storage media.

The invention also offers the opportunity to equip existing drive shafts in electronic devices with additional storage media. Thus, its efficiency can be increased without needing more space.

BRIEF DESCRIPTION OF THE DRAWINGS

The invention is described through examples of advantageous designs represented in detail in the attached drawings. The drawings are given by way of illustration only, and thus are not limitative of the present invention.

The drawings show.

DESCRIPTION OF THE PREFERRED EMBODIMENT

Figure 1:
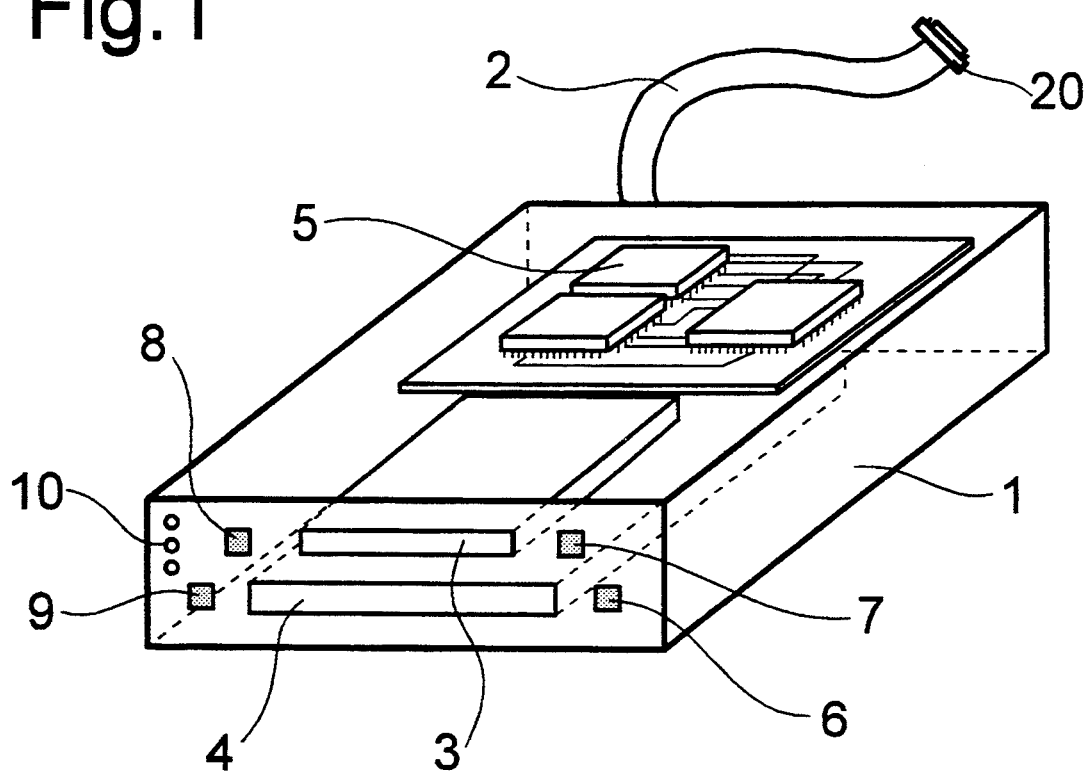
FIG. 1 Write-read unit with a plug-in portion for the IC card, a removable, rotating storage medium and joint select electronics as compact plug-in unit.

FIG. 1 shows a compact write-read unit within a mounting box or frame 1 for the incorporation in an electronic device. The connection to the CPU of the electronic device (not shown) is effected via an interface cable 2 with the plug connector 20. At the front part of the write-read unit, there is a plug-in portion 3 serving as a receptor portion for an IC card and a plug-in shaft 4 designed for a drive of a removable, rotating storage medium (floppy disk). In the rear part of the frame 1, the joint select electronics 5 for the two storage media are arranged. At the front part you can also see the operating and indicating elements, such as the ejecting device 6 for the rotating drive 4 and the ejecting device 7 for the IC card plug-in portion 3, a status display 8 for the IC card plug-in portion 3, a status display 9 for the rotating storage medium 4 as well as indicating lamps 10 for the operating condition of both storage media 3, 4.

Figure 2A:
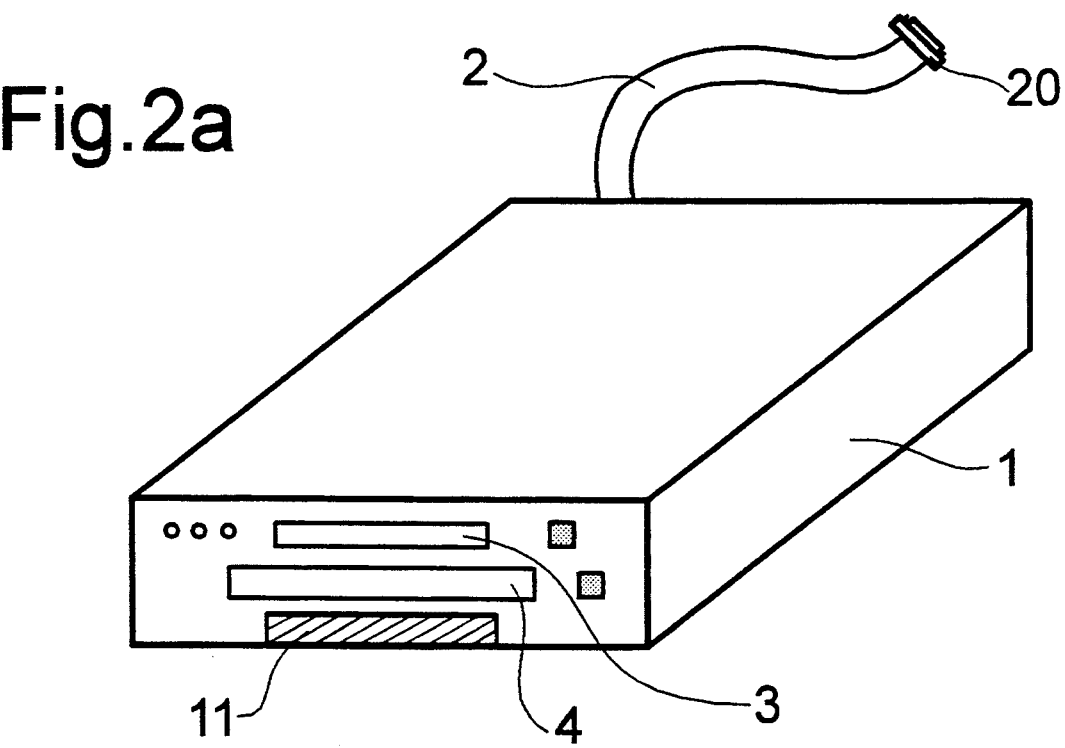
FIG. 2a Write-read unit with a plug-in portion for the IC card, a removable, rotating storage medium and a firmly installed rotating storage medium removable at the front part (hard disk).
Figure 2B:
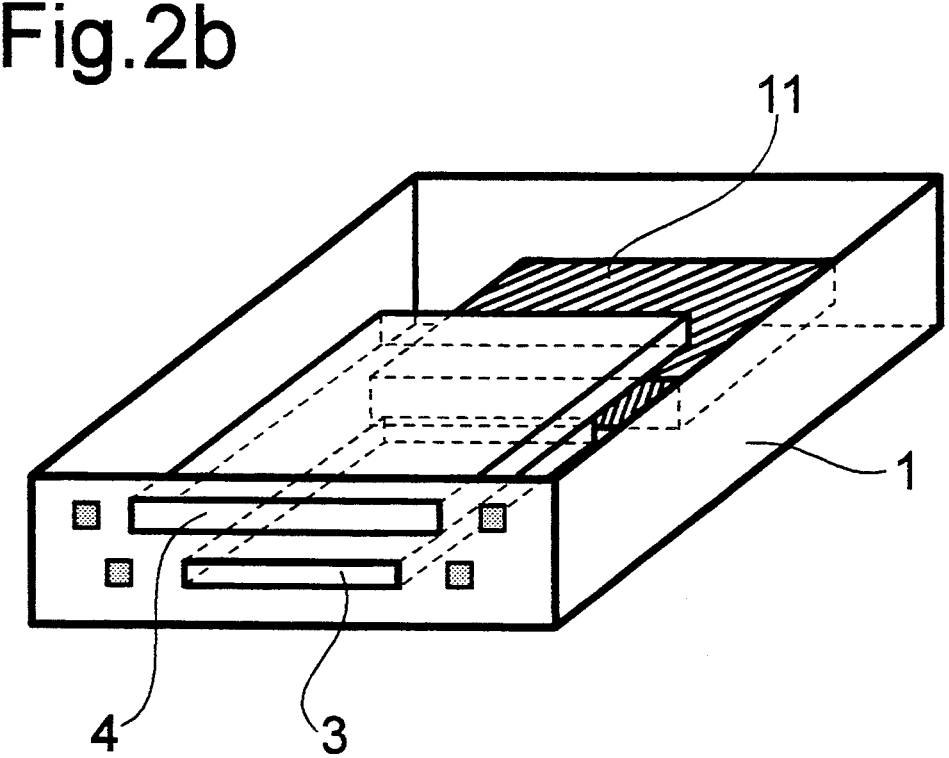
FIG. 2b Write-read unit with a plug-in portion for the IC card, a removable, rotating storage medium and a firmly installed rotating storage medium removable at the rear part (hard disk).

FIGS. 2a and 2b show the mounting box 1 with the additional arrangement of a firmly installed, rotating storage medium (hard disk) 11 which is accessible in FIG. 2a from the front part and in FIG. 2b from the rear part.

Figure 3:
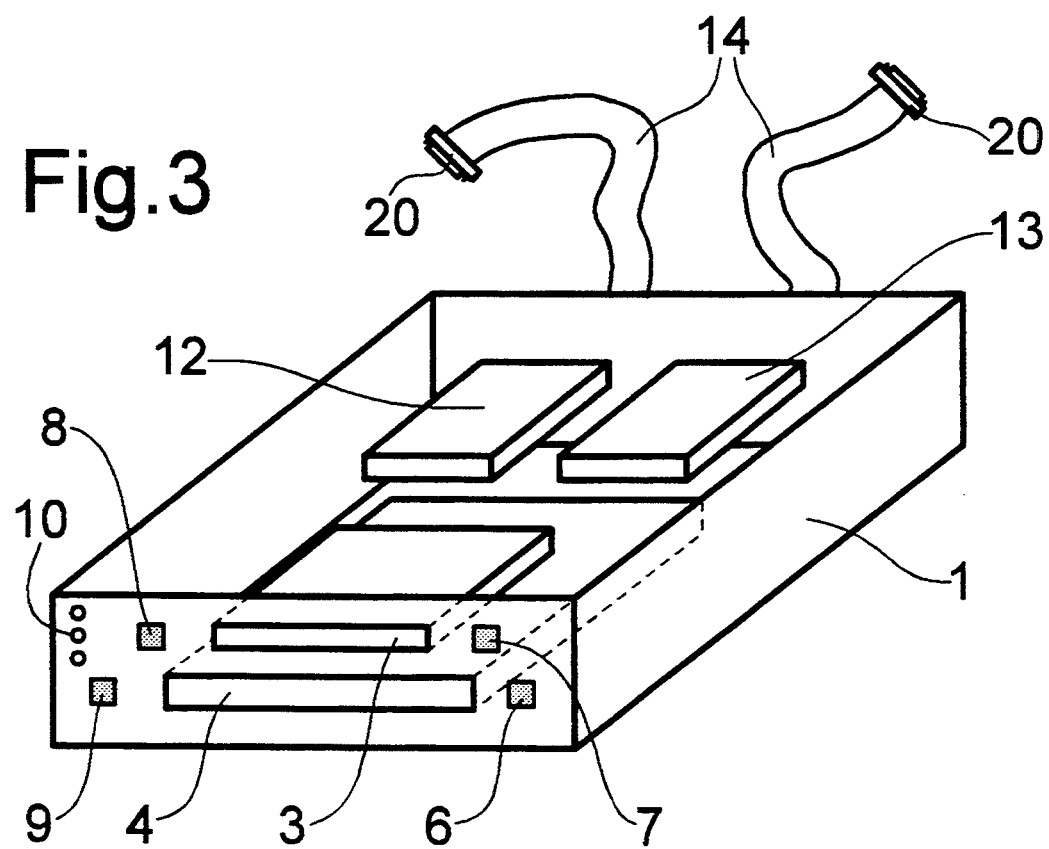
FIG. 3 Write-read unit with a plug-in portion for the IC card, a removable, rotating storage medium and separate select electronics.

The mounting box 1 with a separate arrangement of the select electronics 12 for the IC card and the select electronics 13 for the rotating storage medium is shown in FIG. 3. Separate interface cables 14 lead from the two select electronics 12, 13 to the central processing unit.

Figure 4:
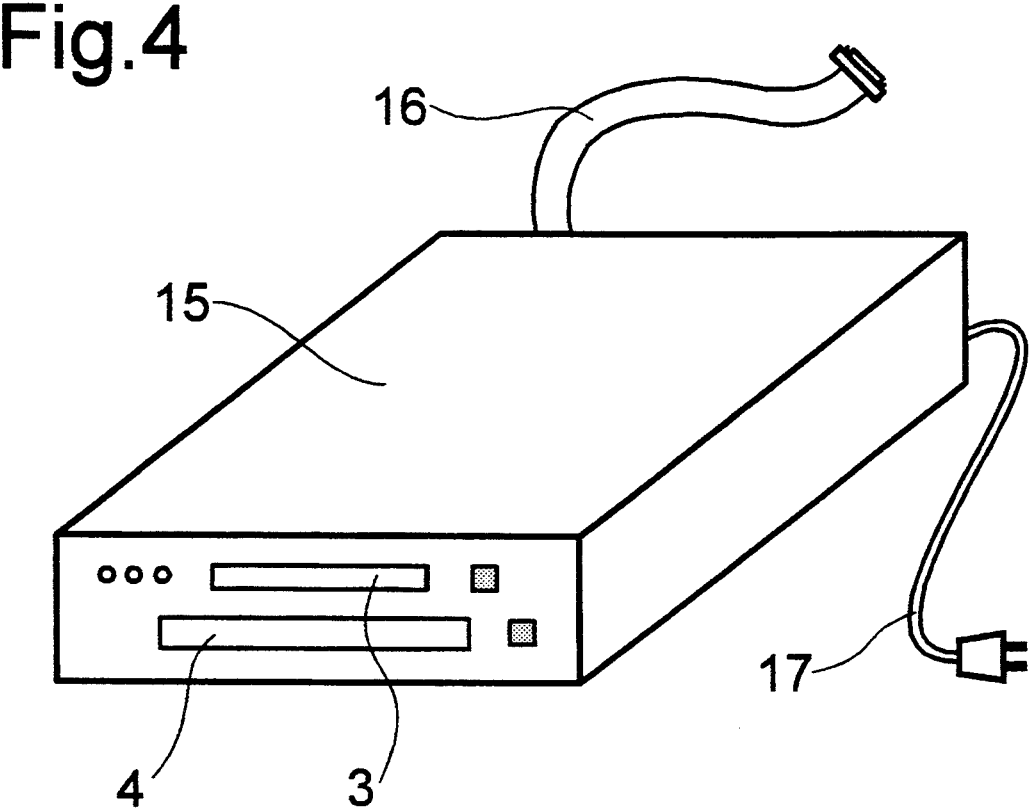
FIG. 4 Write-read unit as an independent module for establishing the connection to an electronic device.

FIG. 4 shows the compact write-read unit as an independent module being accommodated in a housing 15 for establishing a separate connection to an electronic device by means of an interface connection cable 16 and separate power supply 17.

Figure 5A:
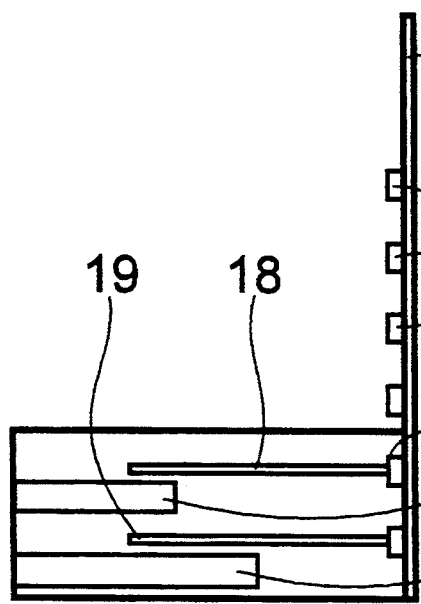
FIG. 5 Side view and front view for the insertion of the write-read unit into the chassis of an electronic device with plug connectors arranged on the printed circuit.
Figure 5B:
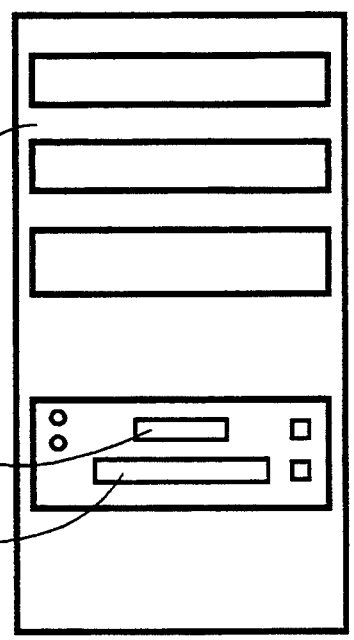

The write-read unit according to the present invention can be incorporated in a chassis of the housing 22 of the electronic device as shown in FIG. 5. The IC card plug-in portions 3 and the rotating storage media 4 with their selection circuits 18, 19 are directly connected to a printed circuit board 21 via plug connectors 20.

Figure 6:
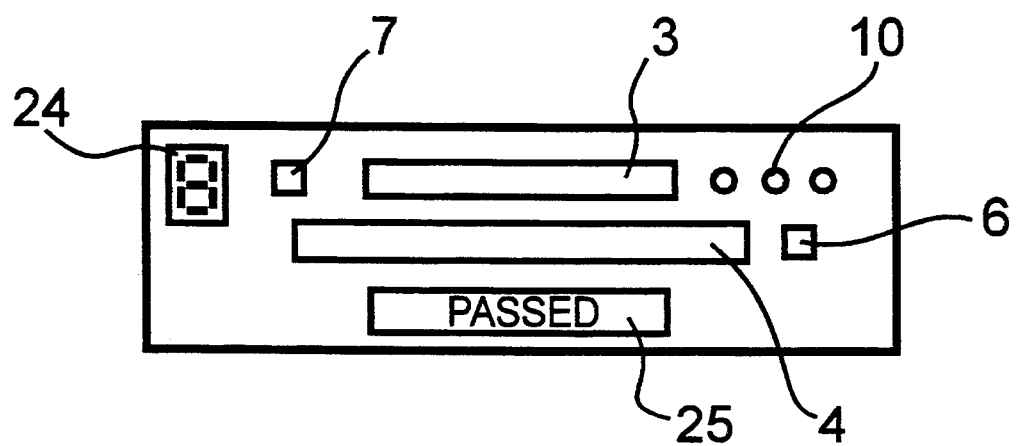
FIG. 6 Front view of the compact write-read unit with the operating and indicating elements.

FIG. 6 shows an advantageous design for arranging the compact write-read unit with its operating and indicating elements 6, 7, 10, 24 and 25 at the front part of the housing 1. Beside the plug-in portion 3 as receptor portion for an IC card and the plug-in shaft 4 designed for a drive of a removable, rotating storage medium (floppy disk), a suitable arrangement is provided for the ejecting device 6 for the rotating drive, the ejecting device 7 for the IC card plug-in portion 3, a status display 24 for the storage media 3, 4, the indicating lamps 10 for the operating condition as well as an LED 25 for operating and handling information.

Figure 7:
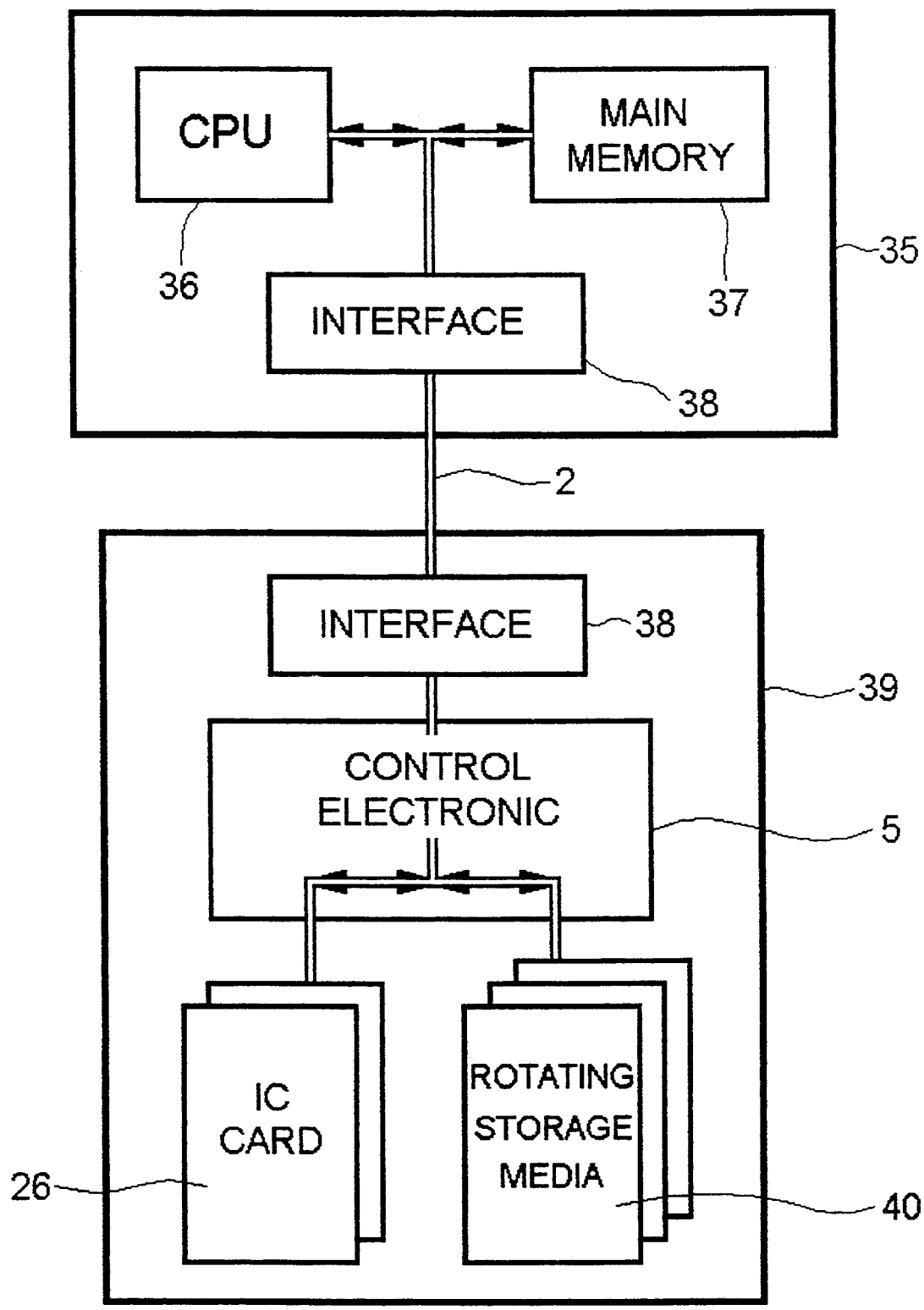
FIG. 7 Schematic block diagram for the embodiment of the arrangement and mode of function featuring the compact write-read unit designed for the extension and shifting of functions in connection with the electronic data processing machine.

FIG. 7 shows the electronic data processing machine 35 with the central processing unit (CPU) 36 and the main memory 37. Via an interface module 38, the data processing machine 35 is connected with the module for the extension and shifting of functions 39 designed as a compact write-read unit. The module 39 has one or more plug-in places for IC cards 26 and one or more plug-in shafts for rotating drives 40. The IC card 26 (or cards, respectively) and the rotating storage medium 40 (or storage media, respectively) are connected with each other via intelligent control electronics 5. The control electronics 5 effect a direct data processing, independent of the central processing unit (CPU) 36, which takes place between the IC card 26 and the rotating storage medium 40 for certain courses of processing, as for instance shown in the FIGS. 8 to 11, and at the same time, the IC card 26 and the rotating storage medium 40 can be selected individually and separately from the central processing unit (CPU) 36 via the interface module 38. When doing so, it is possible to either accommodate the module designed according to the invention directly in an existing built-in shaft of an electronic data processing machine or to design this module as a separate device which is then connected with the electronic data processing machine 35 via a connecting lead 2.

Figure 8:
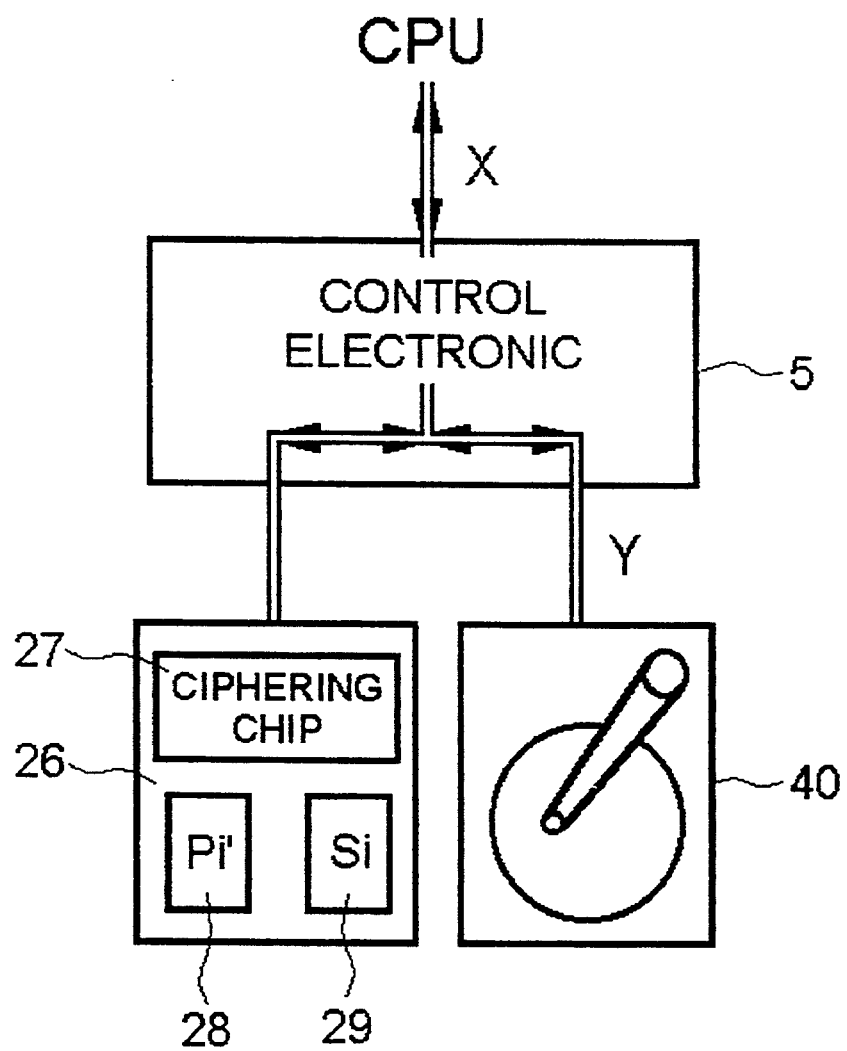
FIG. 8 Use of an IC card in the module for performing a ciphering function for ensuring access security and data protection.

FIG. 8 shows the use of an IC card 26 to ensure the access and data security of the storage media. On the IC card 26 a handwired ciphering chip (ASIC) Z7 is arranged on which a ciphering algorithm is implemented, serving for ciphering the data files X to be stored in one or several storage medium 40, as coded file Y and deciphering it before being loaded into the central processing unit (CPU). The ciphering algorithm implemented on the ciphering chip 27 contains a coded pass word (Pi') 28 and a user-dependent secret cipher (Si) 29. Neither the coded pass word (Pi') 28, the secret cipher (Si) 29 nor the ciphering algorithm can be read by the data processing machines. The secret cipher (Si) 29 is not known to the user. After starting the system, a pass word (Pi) known to the user only is interrogated and compared with the deciphered pass word (Pi') 28 stored on the IC card. The user will only get access to the data processing machine if the two pass words are coinciding.

According to the invention, the write-read unit will make it possible for the first time to incorporate drives with plugable and removable flat modules (IC cards)

into existing computers without needing additional space, thus being able to execute complex data processing transactions which are required, for instance, for data security without the need of using the central processing unit.

Figure 9:
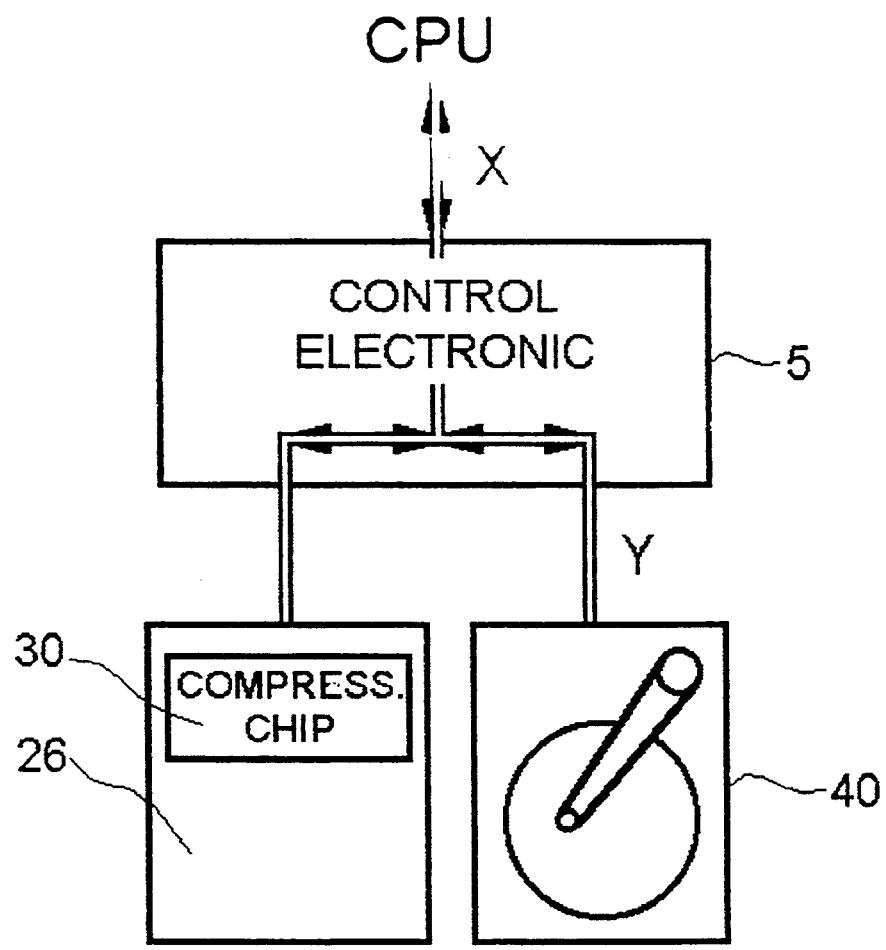
FIG. 9 Use of the IC card in the module for extending its functions as a data compression unit.

In FIG. 9 an integrated circuit (IC) for data compression 30 is arranged on the IC card 26. The data flow X, when being written on the rotating storage medium 40, will first be compressed by the compression IC card and only the compressed data Y will be stored on the rotating storage medium 40. When reading, the compressed data Y will first be decompressed by the compression IC and then transmitted to the CPU as decompressed data X. The process of data compression and decompression is run via the joint control electronics 5, independently of the central processing unit (CPU).

Figure 10:
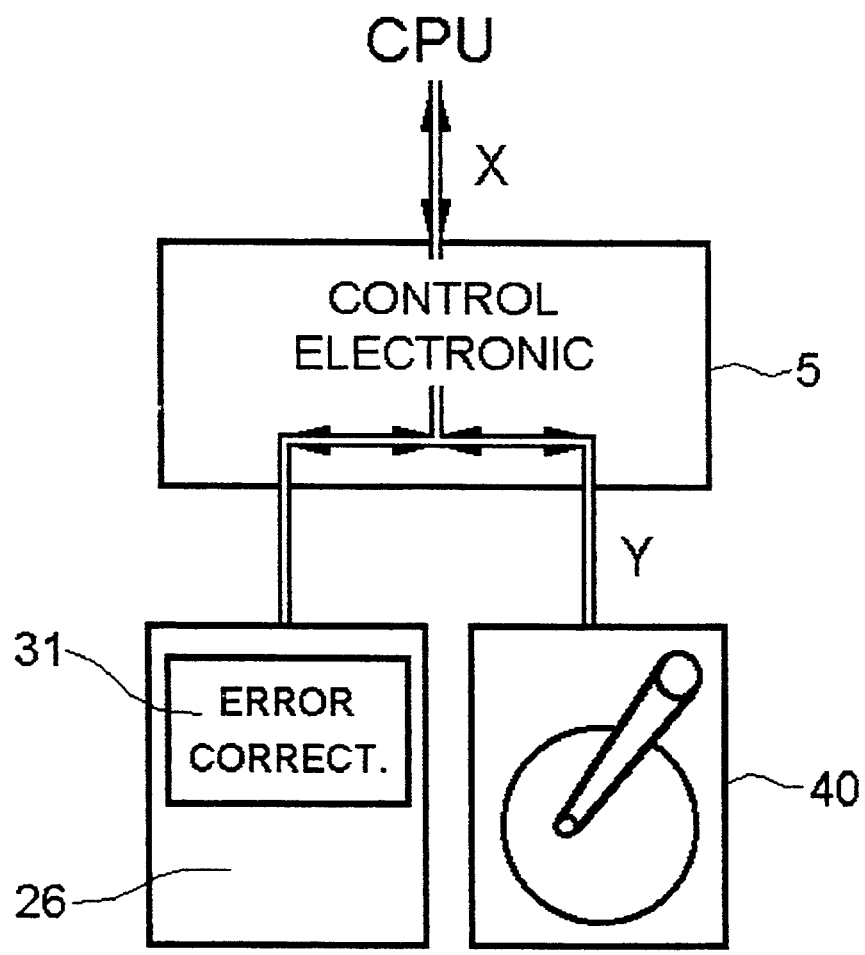
FIG. 10 Use of the IC card in the module for extending its functions as an error-detection and correction unit.

In FIG. 10 the IC card 26 is used as an error-detection and correction unit with an integrated circuit for error-detection and correction 31. When the data are written by the central processing unit (CPU), a check sum is calculated for the data flow X and attached to the data Y. The data X and Y will then be jointly stored on the rotating storage medium 40. When reading the data from the rotating storage medium 40, a check sum Y' is calculated and compared with the check sum Y. In the case that the two check sums Y and Y' are not equal, an error correction is initiated.

Figure 11:
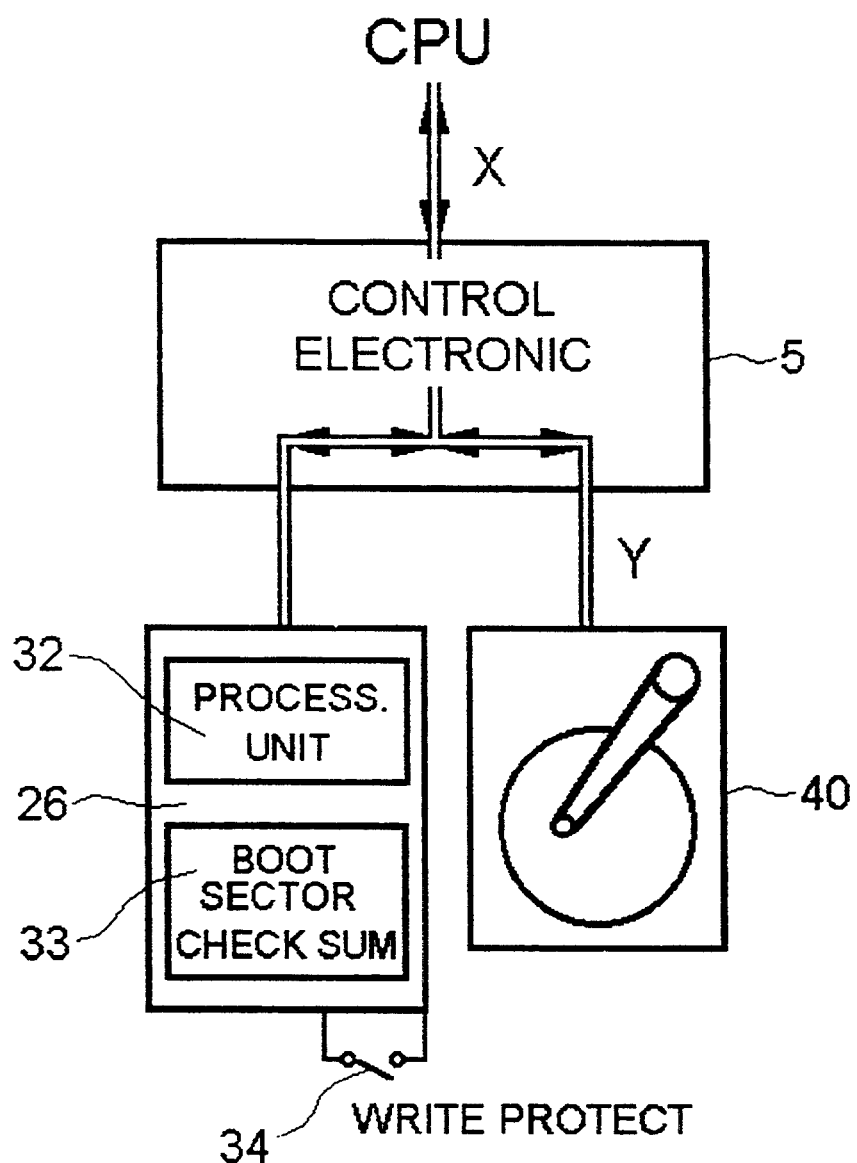
FIG. 11 Use of the IC card in the module for extending its functions as a data protection unit.

The protection from programs illegally installed or being installed on the data processing machine, such as viruses, worms, Trojan horses, is ensured by a processing unit 32 provided for this purpose on the IC card 26 as shown in FIG. 11. Therefore, the boot sector is residently stored in a storage 33 on the IC card 26. When writing the boot sector, a switch 34, which is at the IC card accessible from outside must, be closed. The user will close the switch 34 only if an overwriting of the boot sector is desired. When reading, the switch 34 must be open in order to avoid uncontrolled overwriting. For all files a check sum is stored on the card in the same storage 33 which will be controlled when reading. In the case that the check sums do not match, an alarm will be released.

What is claimed is:

1. A module for extending the functionality of an electronic device comprising:
   a write-read unit having a compact housing, and in said housing there is at least one drive for rotating storage media and at lease one storage media receptor portion for receiving a plugable, removable, encapsulated flat card provided with highly-integrated electronic circuits for data processing and storage independent of a central processing unit (CPU) of said electronic device;
   said housing accommodates further a control electronics for joint or separate selection of the storage media and, at the same time, establishing a direct intelligent connection independent of the central processing unit (CPU) between the at least one drive for rotating storage media and said at least one receptor portion for receiving a plugable, removable, encapsulated flat card such that the at least one drive for rotating storage media and the at least one receptor portion can communicate independently of the central processing unit; and
   an interface module for establishing a connection between the control electronics and the central processing unit (CPU) of said electronic device.

2. The module according to claim 1, wherein said housing is equipped with several optoelectronic displays arranged at the front part and that switches and-/or buttons, mechanical ejecting devices and electromechanical locking devices are arranged at the front and-/or rear parts.

3. The module according to claim 2, wherein said optoelectronic displays are segment displays, LED's and/or liquid-crystal displays.

4. The module according to claim 1, wherein said housing of the write read unit is either mechanically integrated in a plug-in shaft of the electronic device or arranged outside of the electronic device.

5. The module according to claim 1, wherein said control electronics is designed as a firmly wired control or consisting of modules being controlled by a programable microcode.

6. The module according to claim 1, wherein said connector module consists of a printed circuit with at least one part for establishing the connection with the control electronics, providing at least one plug connector for each port.

7. The module according to claim 1, wherein said connector module is a multi-pole connection cable per each control electronics and each end said connection cable is equipped with a plug connector.

8. The module according to claim 1, wherein said write-read unit has a power supply system independent of the electronic device.

9. The module according to claim 1, with a ciphering chip being integrated on the flat card between the at least one drive for rotating storage media and the central processing unit (CPU) and said ciphering chip serving, independently of the central processing unit (CPU) via the control electronics, to code the data to be written on said drives for rotating storage media or to decode the data when reading them according to a hardware algorithm.

10. The module according to claim 1, further comprising a data compression circuit being integrated on the flat card between the one drive for rotating storage media and the central processing unit (CPU), and said data compression circuit serving, independently of the central processing unit via the control electronics, to compress or decompress, respectively, the data to be written on said drives for rotating storage media and the central processing unit.

11. The module according to claim 1, further comprising an error-detection and correction circuit being integrated on the flat card between the at least one drive for rotating storage media and the central processing unit (CPU), and said error-detection and correction circuit serving, independently of the central processing unit via the control electronics, to correct the data stored on said drives for the rotating storage media.

12. The module according to claim 1, further comprising a data protection circuit for protecting against programs illegally installed or being installed on the electronic device and a storage for residently storing a boot sector and a certain check sum on the flat card being integrated between the at least one drive for rotating storage media and the central processing unit, and said data protection circuit serving, independently of the central processing unit (CPU) via the control electronics, to check the data stored or to be stored on said drives for the rotating storage media; a switch is arranged on the flat card which is accessible from outside the module and must be closed when writing the boot sector if an overwriting of the boot sector is desired, and must be open when reading the boot sector in order to avoid uncontrolled overwriting.

* * * * *